Sept. 13, 1966      O. R. BEHRENS      3,271,876
DRYER CONTROL DEVICE
Filed Nov. 20, 1962
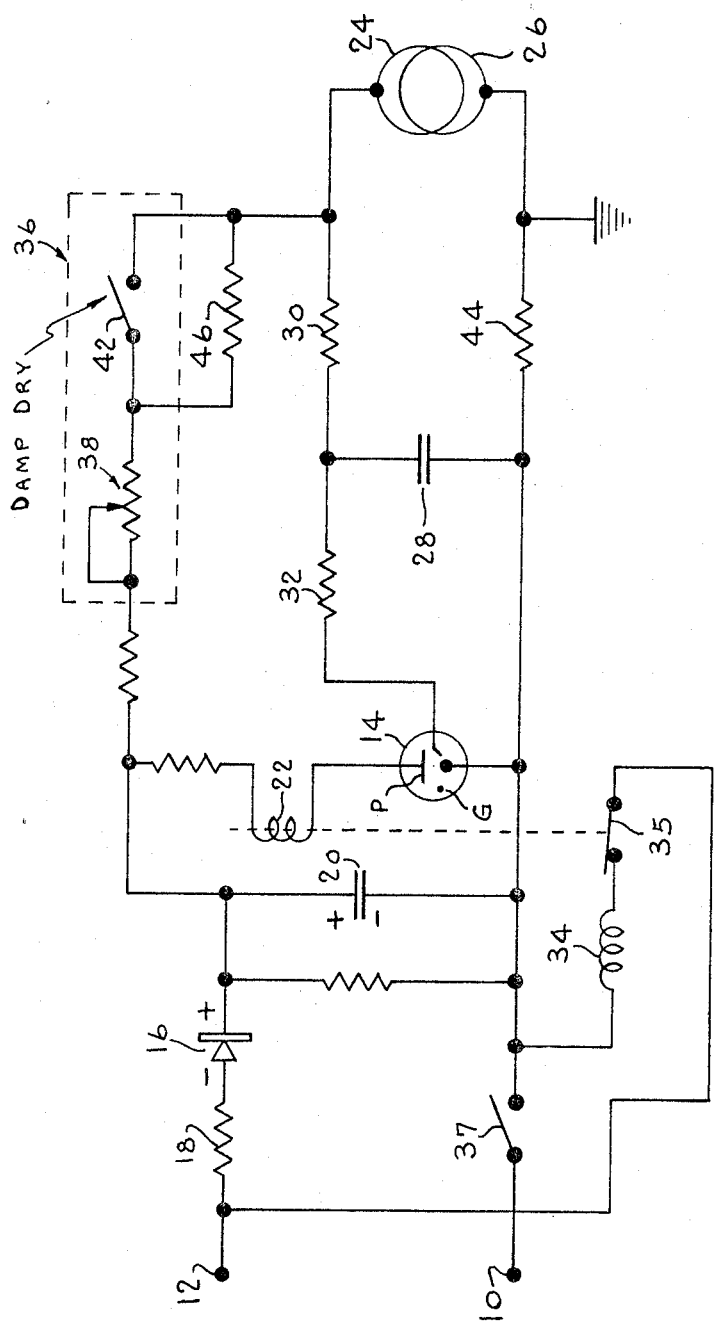
INVENTOR.
OTTO R. BEHRENS
BY Bayard H. Michael
ATTORNEY

3,271,876
DRYER CONTROL DEVICE
Otto R. Behrens, Skokie, Ill., assignor to Controls Company of America, Melrose Park, Ill., a corporation of Delaware
Filed Nov. 20, 1962, Ser. No. 239,124
2 Claims. (Cl. 34—45)

This invention relates to dryer controls and, more particularly, to dryer controls of the type which provide control based on direct moisture sensing.

In controls of the type with which this invention is concerned a voltage is applied across a pair of spaced sensing members and the current leakage between the members is dependent upon the moisture content of the clothing within the dryer drum. The rate of voltage leakage between the sensing members gives a measure of the moisture content of the clothing. The problem has been to monitor the leakage between the sensing members (or the voltage build-up between the sensing members) and to translate it into a signal which is usable in effecting control over particular dryer functions. To this end various circuits have been proposed in attempts to achieve a practical, workable moisture sensing control which would translate the moisture content of the clothing into a usable signal; however, these prior attempts have not proven entirely satisfactory for reasons of accuracy or cost.

The primary object of this invention is to provide an accurate, sensitive and dependable moisture sensing control which is relatively inexpensive and which exhibits virtually an unlimited useful life with respect to the dryer itself.

For the achievement of this object, this invention uses an electric control circuit including a thyratron tube and applies a voltage across a pair of relatively spaced sensing members and to the thyratron. The thyratron is connected in a manner to control actuation of a relay, or other suitable control device, and the voltage applied to the thyratron is initially below its ionization voltage so that the thyratron is initially non-conducting and the relay is unactuated. The sensing member to which the voltage is applied is included in the grid circuit of the thyratron tube so that the potential of the grid will correspond to that of the sensing member. As the leakage of current between the sensing members decreases due to decreased moisture content of the clothing, the grid of the thyratron tube will approach the condition wherein it will render the tube conductive. When the tube conducts, the relay is actuated. Preferably a filtered D.C. voltage is applied to the thyratron and to the sensing members and, also, a filtered voltage is impressed on the grid of the thyratron with the filtering arrangement for the grid including a capacitor which is also operative to provide a desirable time delay in the grid circuit to insure against premature tube firing due to false signals resulting from a small load. It may also be desirable to include means for varying the voltage applied to the sensing members so as to provide some degree of selection with respect to the degree of dryness available from the dryer.

Other objects and advantages of this invention will be pointed out in, or by apparent from, the specification and claims, as will obvious modifications of the embodiment shown in the drawing which consists of a schematic circuit diagram.

With particular reference to the drawing, a voltage is impressed across line terminals 10 and 12 and, through a diode 16, is applied to plate P of thyratron tube 14. Resistance element 18 and capacitor 20 are preferably included in the plate circuit of the thyratron tube to provide a filtered D.C. supply. Relay 22, or other suitable control means, is connected in series with the tube and the voltage applied to plate P is selected so as to be below the normal breakdown voltage of the tube. Thus, the thyratron is initially non-conductive and relay 22 is in an inoperative state.

The filtered D.C. voltage is also applied to ring 24 of a pair of electrically conductive, relatively spaced rings 24 and 26. Sensing ring 24 is connected in the grid circuit of the thyratron so that the voltage on grid G corresponds to the potential of sensing ring 24. Sensing ring 26 is connected to the opposite line terminal 10 and, for reasons which will be pointed out hereinafter, also preferably includes a ground connection 46. When the clothing, or other material being dried, contains a high percentage of moisture, the resistance between the rings 24 and 26 is relatively low and the leakage of current from ring 24 to ring 26 is high and the potential of grid G will not be sufficiently high to render the thyratron conductive. As the clothing dries, its resistance increases and the current leakage decreases so that the potential of ring 24 builds up and eventually triggers the thyratron, rendering it conductive. With the thyratron having been rendered conductive, current flows through and operates relay 22 to effect a desired dryer operation. More particularly, the energization of a coil 34 of a solenoid can be controlled through relay contacts 35 with the solenoid being used to effect a particular dryer operation, e.g. to terminate dryer operation or, if desired, to initiate and control a time-out heat or cool-down cycle which will complete the drying operation. The thyratron having been rendered conductive will continue to conduct until its electric supply circuit is opened by means of a suitable switch 37 actuated in any desired manner. It will be noted that the thyratron is only energized after the drying operation which, unless a time-out cycle is provided, is momentary and even where a time-out is provided it will be of relatively limited duration. The useful life of the tube is thereby markedly increased, actually the useful life of the tube is virtually unlimited with respect to the life of the dryer itself since the tube will, under normal operating conditions, outlive the dryer.

Due to tumbling of the clothing during the drying operation, a continuous resistance value is not present across the sensing rings with a light load. Instead, the condition between the rings is such that it could apply a sharp voltage rise to trigger the thyratron tube. To smooth out and filter this voltage a capacitor 28 and a resistance 30 are connected in the grid circuit. As the resistance of the clothing increases, a charge is built up on capacitor 28 and when the voltage on the capacitor has reached a preselected value, the capacitor discharges and the tube is rendered conductive thereby providing a desirable time delay in rendering the tube conductive and preventing premature firing of the tube due to a small and/or tumbling load. Resistor 32 is also included in the grid circuit to limit the current to a safe value. The control of this invention provides for accurate control over the degree of dryness of the clothing and, in practice, has proven to be effective in measuring the moisture content of the clothing down to the range of approximately 3 to 7%.

Preferably, a manual control 36 is provided to vary the voltage applied to ring 24 and includes a potentiometer 38 and fixed resistance 40. A switch 42 is operative to switch the fixed value resistance into and out of the circuit as desired. With control 36 the drying cycle can be controlled to provide a wide degree of selection in drying cycles. For example, to provide a "damp dry" operation switch 42 is closed to shunt the fixed resistance, whereas, for a "regular dry" cycle the fixed resistance is included in the circuit. Potentiometer 38 also provides for some degree of selection within the "regular dry" or "damp dry" cycles. It will be appreciated that the two cycles discussed are merely examples of the type of control which can be effected and that other variations are possible. Ring 26 is connected to the opposite side of the line, terminal 10, through a resistance 44 and to enhance "damp dry" operation is preferably provided with ground connection 46 for ring 26.

The moisture sensing control constructed in accordance with this invention provides for extremely close control over a dryer operation and will bring the moisture content of the material being dryed down to the range of approximately 3 to 7%. The control eliminates the possibility of false or premature actuation of the thyratron tube by initiating a time delay in the firing of the thyratron tube to allow the sensing rings to "see" a representative sample of the material. In accomplishing this highly efficient and effective control a relatively simplified and inexpensive control is provided, and one which exhibits virtually an unlimited life in relation to the dryer itself.

Although but one embodiment of the present invention has been illustrated and described, it will be apparent to those skilled in the art that various changes and modifications may be made therein without departing from the spirit of the invention or from the scope of the appended claims.

What I claim is:
1. A dryer control for use in combination with a pair of relatively spaced sensing members the leakage current across which is dependent on the amount of moisture contained in the articles being dried, said control comprising,
  a thyratron tube,
  rectifying means connected in circuit with and operative to apply a D.C. voltage to one of said members, said rectifying means also connected to the plate circuit of said tube for applying a predetermined D.C. voltage to said tube so that said tube is normally in a nonconducting state,
  variable resistance means connected in circuit with said rectifying means and said sensing members for selectively adjusting the amount of resistance in the circuit to vary the voltage applied to said one sensing member, said variable resistance means including a rheostat, a fixed resistance and means for selectively bypassing said fixed resistance and connecting said fixed resistance in circuit with said rheostat,
  control means in series circuit relationship with and controlled by said thyratron tube,
  the grid circuit of said thyratron tube including one of said sensing members and being responsive to the potential across said sensing members,
  filtering means in the plate circuit of said tube and in circuit with said one sensing member to filter the D.C. voltage applied to said tube and said one sensing member,
  and capacitive means connected in said grid circuit between the grid of said tube and said one sensing member for effecting a time delay in the response of said tube to the potential across said sensing members whereby said tube is rendered conductive and actuates said control means when a potential corresponding to a predetermined moisture content of said articles appears across said sensing members.

2. The combination of claim 1 wherein the other of said sensing members is grounded.

References Cited by the Examiner
UNITED STATES PATENTS

| | | | |
|---|---|---|---|
| 2,045,381 | 6/1936 | Elberty | 34—55 |
| 2,820,304 | 1/1958 | Horecky | 34—45 |
| 3,180,038 | 4/1965 | Chafee | 34—45 |
| 3,210,863 | 10/1965 | Nye et al. | 34—45 |

FOREIGN PATENTS 877,553  9/1961  Great Britain.

FREDERICK L. MATTESON, JR., *Primary Examiner.*

NORMAN YUDKOFF, WILLIAM F. O'DEA,
*Examiners.*

W. C. EVERETT, D. A. TAMBURRO,
*Assistant Examiners.*